United States Patent [19]

Bauer

[11] Patent Number: 4,721,391
[45] Date of Patent: Jan. 26, 1988

[54] IMPINGEMENT MIXING DEVICE WITH AUXILIARY INPUT AND PROCESS FOR PRODUCING PLASTIC PARTS

[75] Inventor: Adolf Bauer, Olching, Fed. Rep. of Germany

[73] Assignee: Krauss-Maffei A.G., Fed. Rep. of Germany

[21] Appl. No.: 846,947

[22] Filed: Apr. 1, 1986

[30] Foreign Application Priority Data

Apr. 1, 1985 [EP] European Pat. Off. ........ 85103920.6

[51] Int. Cl.⁴ .................... B01F 5/04; B01F 17/00; B29C 67/22; C08G 18/14
[52] U.S. Cl. .................... 366/171; 264/45.3; 264/50; 264/53; 264/328.6; 264/DIG. 83; 366/159; 366/173; 366/177; 422/133; 425/4 R; 425/817 R; 521/917
[58] Field of Search ............ 264/DIG. 83, 45.3, 53, 264/50, 328.6; 366/159, 173, 172, 171; 422/133; 521/917

[56] References Cited

U.S. PATENT DOCUMENTS

| | | | |
|---|---|---|---|
| 3,256,218 | 6/1966 | Knox | 264/45.3 |
| 3,706,515 | 12/1972 | Keuerleber et al. | 425/4 |
| 3,849,074 | 11/1974 | Ficklinger et al. | 23/285 |
| 3,975,128 | 8/1976 | Schlueter | 425/207 |
| 4,053,283 | 10/1977 | Schneider et al. | 23/252 |
| 4,115,299 | 9/1978 | Muehle | 521/170 |
| 4,129,636 | 12/1978 | Boden | 264/DIG. 83 |
| 4,175,874 | 11/1979 | Schneider | 366/182 |

FOREIGN PATENT DOCUMENTS

| | | |
|---|---|---|
| 1629650 | 2/1971 | Fed. Rep. of Germany . |
| 2513492 | 10/1976 | Fed. Rep. of Germany . |
| 2645937 | 4/1978 | Fed. Rep. of Germany . |
| 2538437 | 2/1979 | Fed. Rep. of Germany . |
| 1376485 | 9/1964 | France .......... 264/DIG. 83 |
| 1588789 | 3/1970 | France . |
| 2158735 | 5/1973 | France . |
| 55-133935 | 10/1980 | Japan .......... 264/DIG. 83 |

OTHER PUBLICATIONS

Schneider, Fritz W., "High Pressure Metering and Impingement Mixing Systems for RIM applications and Free Pour Dispense", 1980, 'pta martin sweets.

Primary Examiner—Philip Anderson
Attorney, Agent, or Firm—Robert J. Koch

[57] ABSTRACT

An impingement mixing device for preparation of plastic parts or objects including cellular foam from at least two reactive synthetic components and an auxiliary component such as liquid foaming agent and including at least two injection ports and a third port for input of the auxiliary component. Inert gas optionally and a foaming agent and further additives are mixed at a point in the cylindrical wall of the component mixing chamber located in or near the vicinity of the radial plane passing through the component openings. The introduction of the inert gas, foaming agent, coloring agent, or further additives is controlled by a cleaning piston which also simultaneously cleans the mixed plastic material penetrated therein from the opening area of the inert gas feeder line. The cleaning piston is part of a control piston, which with its rear segment is located in a metering chamber for the inert gas and optionally also for the foaming agent and the additives. The transition between the rear segment of the control piston and its front segment forming the cleaning piston is in the form of a conical valve seat.

26 Claims, 1 Drawing Figure

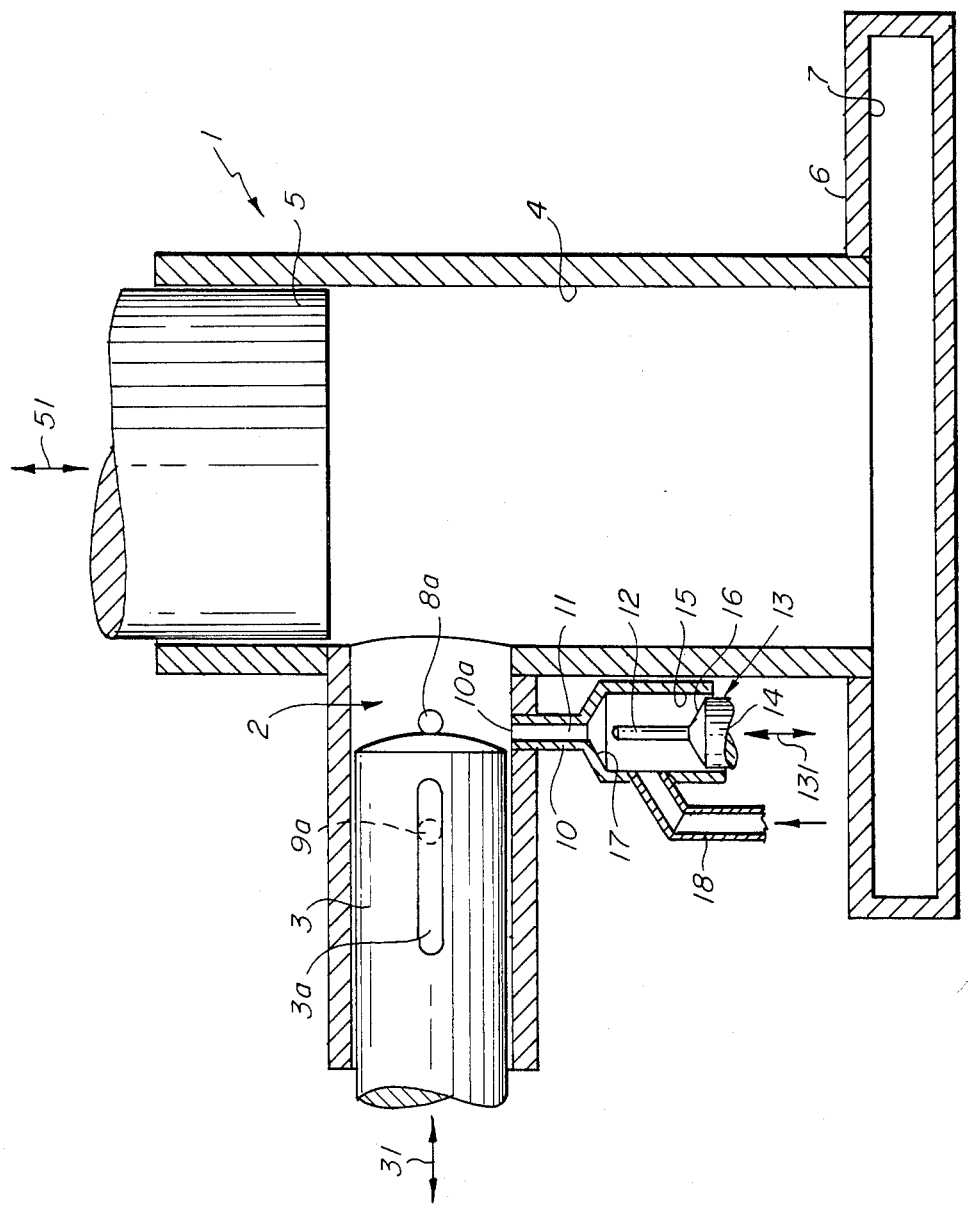

IMPINGEMENT MIXING DEVICE WITH AUXILIARY INPUT AND PROCESS FOR PRODUCING PLASTIC PARTS

BACKGROUND OF THE INVENTION

1. Field of the Invention

The invention relates to a process and apparatus for the preparation of plastic parts or objects from at least two reactive synthetic components. The reactive synthetic components are brought into contact in a mixing chamber by way of impinging streams from injection ports. An additional input port supplies an auxiliary component or components to the mixing chamber. An example of an auxiliary component is a liquid foaming agent for the production of cellular foam.

2. Description of the Related Art

Impingement mixing devices are known for producing plastic parts or objects and are frequently referred to as mixing heads or reaction injection molding mixing heads. Such heads are described in U.S. Pat. Nos. 3,706,515 and 3,975,128. A mixing device for mixing together multicomponent plastic materials, such as polyurethane, and foaming such materials including a supply of air to the mixing chamber is described in U.S. Pat. No. 4,053,283. In the preparation of cellular foam such as polyurethane from two or more reactive synthetic plastic components it is also known to utilize a liquid foaming agent, for example Freon 11. The liquid foaming agent is mixed with one of the synthetic components, for example polyol, prior to its mixing with the rest of the components. The foaming agent passes into the gaseous form under the effect of the heat generated by the reaction of the synthetic components in the casting mold, thereby producing a cellular structure. Upon the cooling of the cellular foam the foaming agent returns to the liquid state. If the cell walls are sufficiently stable, atmospheric air gradually enters the cell structure, whereby the cells are filled with air. In the case of very thin cell walls, without additional measures the cellular structure would shrink. In such cases, an inert gas, for example compressed air, is added to the mixture of synthetic substances. It immediately fills the cells and prevents shrinking. However, the inert gas, in contrast to the liquid foaming agent, cannot be added to one of the reactive synthetic components prior to the mixing process under an adequately high pressure. This is because the mixing of a highly compressed gas into the liquid component cannot be metered with the necessary accuracy. Furthermore, the necessary compression of the inert gas (to more than 200 bar) requires a substantial investment in equipment, which under realistic operating conditions cannot be justified.

In the system disclosed in U.S. Pat. No. 4,053,283 for the above reasons, the inert gas is introduced through an axial channel of a discharge piston into the mixing chamber, which has a pressure of about 5 bar during the mixing phase. The inert gas may be mixed in at a correspondingly low pressure of approximately 6 to 7 bar. At that pressure the gas is easily metered. The conical outlet orifice of the channel in the frontal surface of the piston may be closed by a conical closure piece, to prevent the entry of mixed synthetic plastic material from the mixing chamber into the axial channel. The closure piece is actuated by a pin which passes through an axial channel. Discharge pistons normally have small dimensions for example 5 mm diameter and 200 mm in length and may be equipped with axial recirculating grooves for the synthetic plastic components. The axial channel and the pin guided therein therefor can have only a very small diameter of for example 0.8 mm, the production of which is difficult and results in major problems in production technology. Furthermore, despite the conical closure piece, the entry of mixed plastic material into the axial channel cannot be completely prevented. An increase in pressure in the mixing chamber during the discharge of the mixture (to about 40 bar) is a result of a restriction of the outlet of the mixing chamber. The increased pressure acts on the frontal surface of the discharge piston during the entire discharge process. The sealing effect of the conical surfaces between the closure piece and the channel outlet is not sufficient to prevent penetration of the highly compressed synthetic plastic material. The penetrating material cannot be flushed out by the inert gas due to its strong adhesion to metal surfaces and therefore hardens in the axial channel. In view of the already very small cross section of the channel this rapidly leads to complete clogging of the axial channel. In actual practice, the axial channel must be cleaned in intervals of approximately 4 hours, requiring dismantling of the hydraulic unit and removal of the discharge piston.

U.S. Pat. No. 4,115,299 shows a "frothing" process and head where a liquid foaming agent with a low boiling point is introduced in the quieting chamber of an L-shaped mixing head. The mixing chamber of the head opens into a quieting chamber mounted at a right angle to it. The foaming agent is injected against the opening of the mixing chamber in a counter current. In the process, the liquid foaming agent expands and as a result of its low boiling point, passes into the gaseous state, whereupon a plastic foam is formed in the quieting chamber. No addition of an inert gas is provided for in the process according to U.S. Pat. No. 4,115,299. In this case, mixing of inert gas in the quieting chamber would not lead to satisfactory mixing, even if in place of a foaming agent with a low boiling point a normal foaming agent mixed into one of the components were used.

SUMMARY OF THE INVENTION

It is an object of the invention to provide certain process technological and design measures for the addition of auxiliary components such as gaseous foaming agents to the reactive plastic components with a high degree of mixing, thereby safely preventing the clogging of the auxiliary input port by contamination by mixed and hardening plastic material.

This object is attained according to the invention by an impingement mixing device or "mixhead" which has a mixing chamber and at least a first and second opposed injection ports. The injection ports are arranged in the wall of the cylindrical mixing chamber so as to cause at least two input jets of reactive components such as polyol and isocyanate to impinge and thereby mix and react. The mixing chamber is equipped with a mixing piston which reciprocates in the mixing chamber and may advantageously embody a slide valve and recirculation grooves in order to control the input and-/or recirculation of the reactive components. Mixing heads of this type are described in U.S. Pat. Nos. 3,975,128 and 3,706,515, the disclosures of which are incorporated herein. It is to be expressly understood that the invention is not limited to only mixing heads having pistons with recirculation grooves but includes other types of recirculation methods. The mixing chamber also exhibits a third input port for the introduction of a component into the mixing chamber. The third input port is equipped with a reciprocating cleaning piston for ensuring that material does not harden and thereby clog the third input port. The third input port may be utilized for introduction of an inert gas, a foaming agent, a coloring agent, one of the reactive components such as polyol, or other additive materials such as glass fibers. When a foaming agent is introduced into the mixing chamber, it is done in its liquid state and may thereafter pass into a gaseous state due to heat and/or pressure generated by the reactive components upon mutual introduction into the mixing chamber.

When introducing additional components through a port with a piston as set forth in the invention, it may be advantageous to locate that port in the same radial plane as the injection ports for the reactive components or either ahead or behind that radial plane. According to an advantageous embodiment of the invention, the mixing chamber control piston may be utilized to open the port for the additional components whereby the relative position of the reactive component inlets and the additional component inlets determines the relative sequence of introduction of components into the mixing chamber.

The piston mounted in the input port can be utilized as a slide valve to control the input of material through that port. The port piston may exhibit a first segment having a diameter corresponding to the diameter of its input port and a second segment having a larger diameter than the first segment and located within a metering chamber for the component to be introduced. A conical transition segment between the first and second segment of the port piston cooperates with a matching conical transition between the port outlet and a metering chamber to form a valve seat for blocking the introduction of a component when the port piston is in an extended position.

A further development of the apparatus according to the invention is the sequential introduction of different components through the input port having a port piston, for example, introduction of a foaming agent followed by introduction of an inert gas such as air or nitrogen.

The apparatus and method of the instant invention is equally applicable to mixing heads having a single chamber such as a so-called straight mixing head or those having multiple chambers such as an L-shaped mixing head.

BRIEF DESCRIPTION OF THE DRAWING

The invention is made more apparent by means of an example of embodiment with reference to the drawing.

The FIGURE shows a schematic section, not to scale, through an angled or L-shaped mixing head, whereby the measures according to the invention are carried out.

DETAILED DESCRIPTION OF THE PREFERRED EMBODIMENT

The L-shaped mixing head 1 shown comprises a mixing chamber 2 and an after-mixing of quieting chamber 4, arranged perpendicularly to said mixing chamber. In the mixing chamber 2 a discharge piston 3 is arranged, said piston being reversingly displaceable by a hydraulic unit, not shown, in the direction of the double arrow 31. Another discharge piston 5 is located in the channel 4, again displaceable reversingly by a hydraulic unit, not shown, in the direction of the double arrow 51. The channel 4 has a substantially larger volume (larger diameter, greater axial length) than the mixing chamber 2, in order to deflect the turbulent material flow exiting from the mixing chamber 2 and to quiet it. The material flow proceeds in a laminar manner from the channel 4 into the mold cavity 7 of a schematically indicated casting mold 6. The casting mold is mounted on a mold support, not shown.

Feeder lines for the reactive plastic components, for example isocyanate and polyol in the case of the production of polyurethane, open perpendicularly to the plane of the drawing into the mixing chamber 2. From the circular opening orifices of these feeder lines only the orifice 8a is visible in the drawing. The other orifice (not shown) is located diametrically opposite the orifice 8a, so that the reactive plastic components introduced under a high pressure (up to 200 bar) impinge and are mixed together in counter current. When the discharge piston 3 is in the position shown, the orifices are open and the plastic components enter the mixing chamber. Following the injection of the plastic components into the mixing chamber 2, the piston 3 is displaced into the direction of the discharge, whereby the orifices of the plastic components are closed by the piston 3. After the closure has been completed, a communication is established by the recirculating grooves in the piston 3 (of which only groove 3a is visible, while the other groove is located diametrically opposite) between the plastic feeder lines and associated return lines (of which again only one return line is visible with its orifice 9a). This recirculating connection remains in effect due to a suitable choice of the axial length of the grooves, until the piston 3 is returned into its initial or retracted position shown so as to begin a new "shot" or mixing cycle.

According to the invention, in or near a radial plane passing through the openings of the component feeder lines 8a (perpendicular to the plane of the drawing), an orifice or opening 10a of a further feeder line 10 is located. An inert gas such as compressed air is added to the reactive plastic components through the orifice or opening 10a. The inert gas is introduced simultaneously with or slightly delayed from the introduction of the components into the mixing chamber 2. The pressure of the gaseous foaming agent is slightly higher than the pressure within the mixing chamber 2, for example 6 to 7 bar, with a mixing chamber pressure of for example 5 bar.

The foaming agent required for the production of cellular foam is either mixed into one of the plastic components prior to its entry into the mixing chamber 2 under an appropriately high pressure, or in a simpler manner, injected directly into the mixing chamber 2, wherein it is merely necessary to pressure the foaming agent to about 6 to 7 bar, compared to 200 bar in the method mentioned first. In the second method, the inert gas and the foaming agent are introduced in succession through the feeder line 10. Optionally, further additions, such as pigments, may be injected directly into the mixing chamber 2 through the feeder line 10.

The position of the opening 10a shown in the FIGURE is slightly in front of the radial plane of the inlet orifices 8a as viewed in the direction of discharge of the mixing chamber 2. This is to accommodate the cylindrical curvature of the frontal surface of the discharge piston 3, which in its extended other terminal position is abutting flush against the piston 5 of the quieting chamber 4. In a mixing head without quieting chamber 4, i.e., the mixing chamber 2 opens directly into the mold cavity 7, the frontal surface of the piston 3 is flat, so that the orifice or opening 10a is located exactly in the radial pane passing through the openings of the component feeder lines.

Alternatively, it is possible to relocate the opening 10a from the radial plane of the component feeder line orifices 8a away from the opening of the mixing chamber into the calming chamber in order to obtain an introduction of the inert gas or the foaming agent or other additives into the mixing chamber 2, delayed in time with respect to the injection of the components. It is to be understood that feeder line 10 may be utilized to introduce inert gas, foaming or frothing agents, color pigment or other additives including, but not limited to, glass fibers and fillers.

The additional feeder line 10 is equipped with a cylindrical channel or opening area 11, into which a cleaning piston 12 may be inserted to the orifice or opening 10a. The cleaning piston 12 forms the forward segment of a control piston 13, the rear segment 14 is guided in a metering chamber 15 and coupled with a hydraulic unit, not shown. This hydraulic unit moves the control piston reversingly in the direction of the double arrow 131. The diameter of the rear piston segment 14 is substantially greater than the diameter of the cleaning piston 12. The transition between the cleaning piston 12 and the rear piston segment 14 is formed by a conical surface 16, which with a corresponding conical surface 17 of the metering chamber 15 constitutes a valve seat. The inert gas arrives through a line 18 at the location 19 in the metering chamber 15, with said location 19 being located in front of the conical surface 17 as viewed in the direction of flow of the inert gas, so that the valve seat of the two conical surfaces 16, 17 blocks the supply of the inert gas, if the control piston 15 is slid forward against the mixing chamber 2. As with the discharge of the material from the mixing chamber 2, the pressure in said mixing chamber is strongly rising (from about 5 bar to about 40 bar), without the closing of the opening 10a by the cleaning piston 12, material residues would enter the feeder line 10 from the mixing chamber 2 and harden therein. The cleaning piston 12 performs, however, not only the function of closing off the opening 10a, but also the further function of returning the mixed plastic material entering the channel opening area 11 into the mixing chamber 2. The clogging of the channel or opening area 11 is thus prevented.

According to an advantageous embodiment, the discharge piston 3 of the mixing chamber 2 is moved from the terminal or retracted position shown into the discharge direction or extended position only after the cleaning piston 12 is extended or has completely entered the channel or opening area 11, thereby forcing all material that has penetrated the cylindrical opening into the mixing chamber 2. If the opening or orifice 10a is located behind (with respect to component flow) the aforementioned radial plane, the discharge piston 3 may be moved from its terminal or retracted position shown even if the cleaning piston 12 has not yet arrived in its terminal extended position in the opening 10a. This may be arranged in a manner such that the discharge piston 3 closes the openings of the component feeder lines before the flow of the foaming agent is interrupted by the control piston 13, which leads to an after-injection of inert gas into the component mixture. It is similarly possible to interrupt the injection of the foaming agent simultaneously with the component injection, while making sure that the cleaning piston 12 arrives at the foaming agent opening or orifice 10a by the time the frontal surface of the discharge piston 3 attains or reaches opening or orifice 10a.

It should be understood that the invention is not restricted to mixing heads with recirculating grooves in the discharge piston, as the mode of recirculation is immaterial relative to the measures according to the invention. The invention is also applicable to a mixing head comprising one or a plurality of mixing chambers, wherein each high pressure mixing chamber is equipped in the above-described manner with an inert gas or foaming agent or additive supply line.

It is understood further that the number of reactive plastic components being mixed in the mixing chamber is also immaterial. The polyol and isocyanate components mentioned as examples may be introduced for example by means of four radially offset openings located in the same dissecting plane into the mixing chamber, wherein the components polyol A, polyol B, isocyanate A and isocyanate B may have different concentrations and/or pressures and/or additives. In place of compressed air, any other inert gas, for example nitrogen, may be used.

I claim:

1. A method for producing plastic parts or objects comprising the steps of:
   introducing reactive components into a mixing chamber through opposing inlet ports so that the compounds flow out of the mixing chamber;
   introducing an additional component to the mixing chamber through a radial component inlet port;
   controlling the introduction of the additional component by reciprocating a cleaning piston in said radial component inlet part.

2. A method as in claim 1 wherein the step of introducing an additional component is introduction of a liquid foaming agent which passes into a gaseous state due to heat generated by the reaction of said reactive components.

3. A method as in claim 1 wherein the step of introducing an additional component is introduction of a coloring agent.

4. A method as in claim 1 wherein the step of introducing an additional component is introduction of an inert gas.

5. A method as in claim 1 wherein the step of introducing an additional component is introduction of a filler material.

6. A method as in claim 1 wherein the additional component is introduced in a radial plane defined by the opposing inlet ports.

7. A method as in claim 1 wherein the additional component is introduced in a location displaced from a radial plane defined by the opposing inlet ports in the direction of flow.

8. A method as in claim 1 wherein the additional component is introduced into the mixing chamber in a location displaced from a radial plane defined by the opposing inlet ports away from the direction of flow.

9. A high pressure impingement mixing device for mixing together at least two reactive components comprising:
   a mixing chamber exhibiting at least a first and second opposed input port means for introduction of reactive components and a material outlet;

a reciprocating discharge piston mounted in said mixing chamber for cleaning the mixing chamber of said reactive components;

a third input port means for radial introduction of an additional component into said mixing chamber;

a reciprocating port piston mounted in said third input port for cleaning and closing said third input port means.

10. An impingement mixing device as in claim 9 wherein the third input port means is located in a radial plane defined by the first and second opposed input port means.

11. An impingement mixing device as in claim 9 wherein the third input port means is displaced toward the material outlet from a radial plane defined by the first and second opposed input port means.

12. An impingement mixing device as in claim 9 wherein the third input port means is displaced further from the material outlet than a radial plane defined by the first and second opposed input port means.

13. An impingement mixing device as in claim 10 wherein said port piston further comprises:
 a first segment having a first diameter corresponding to a diameter of the third input port; and
 a second segment having a larger diameter than said first segment and disposed in a metering chamber for controlling introduction of the additional component.

14. An impingement mixing device as in claim 13 further comprising:
 a first conical transition segment between said first and second segment of said port piston;
 a corresponding second conical transition between said metering chamber and said third input port;
 wherein said first and second conical transition segments form a valve seat for blocking introduction of said additional component when said port piston is in an extended position.

15. An impingement mixing device as in claim 11 wherein said port piston further comprises:
 a first segment having a first diameter corresponding to a diameter of the third input port; and
 a second segment having a larger diameter than said first segment and disposed in a metering chamber for controlling introduction of the additional component.

16. An impingement mixing device as in claim 15 further comprising:
 a first conical transition segment between said first and second segment of said port piston;
 a corresponding second conical transition between said metering chamber and said third input port;
 wherein said first and second conical transition segments from a valve seat for blocking introduction of said additional components when said port piston is in an extended position.

17. An impingement mixing device as in claim 12 wherein said port piston further comprises:
 a first segment having a first diameter corresponding to a diameter of the third input port; and
 a second segment having a larger diameter than said first segment and disposed in a metering chamber for controlling introduction of the additional component.

18. An impingement mixing device as in claim 17 further comprising:
 a first conical transition segment between said first and second segment of said port piston;
 a corresponding second conical transition between said metering chamber and said third input port;
 wherein said first and second conical transition segments form a valve seat for blocking introduction of said additional component when said port piston is in an extended position.

19. An impingement mixing device as in claim 9 wherein the additional component is inert gas.

20. An impingement mixing device as in claim 9 wherein the additional component is a foaming agent.

21. An impingement mixing device as in claim 9 wherein the additional component is a coloring agent.

22. An impingement mixing device as in claim 9 wherein the additional component is a filler material.

23. An impingement mixing device as in claim 9 further comprising means for selective, sequential introduction of different additional components.

24. An impingement mixing device as in claim 13 further comprising means for selective, sequential introduction of different additional components.

25. An impingement mixing device as in claim 15 further comprising means for selective, sequential introduction of different additional components.

26. An impingement mixing device as in claim 17 further comprising means for selective, sequential introduction of different additional components.

* * * * *